Aug. 15, 1933. B. S. MINOR 1,922,386
LOCKING DEVICE FOR SWIVELING CASING HOOKS
Filed June 10, 1932
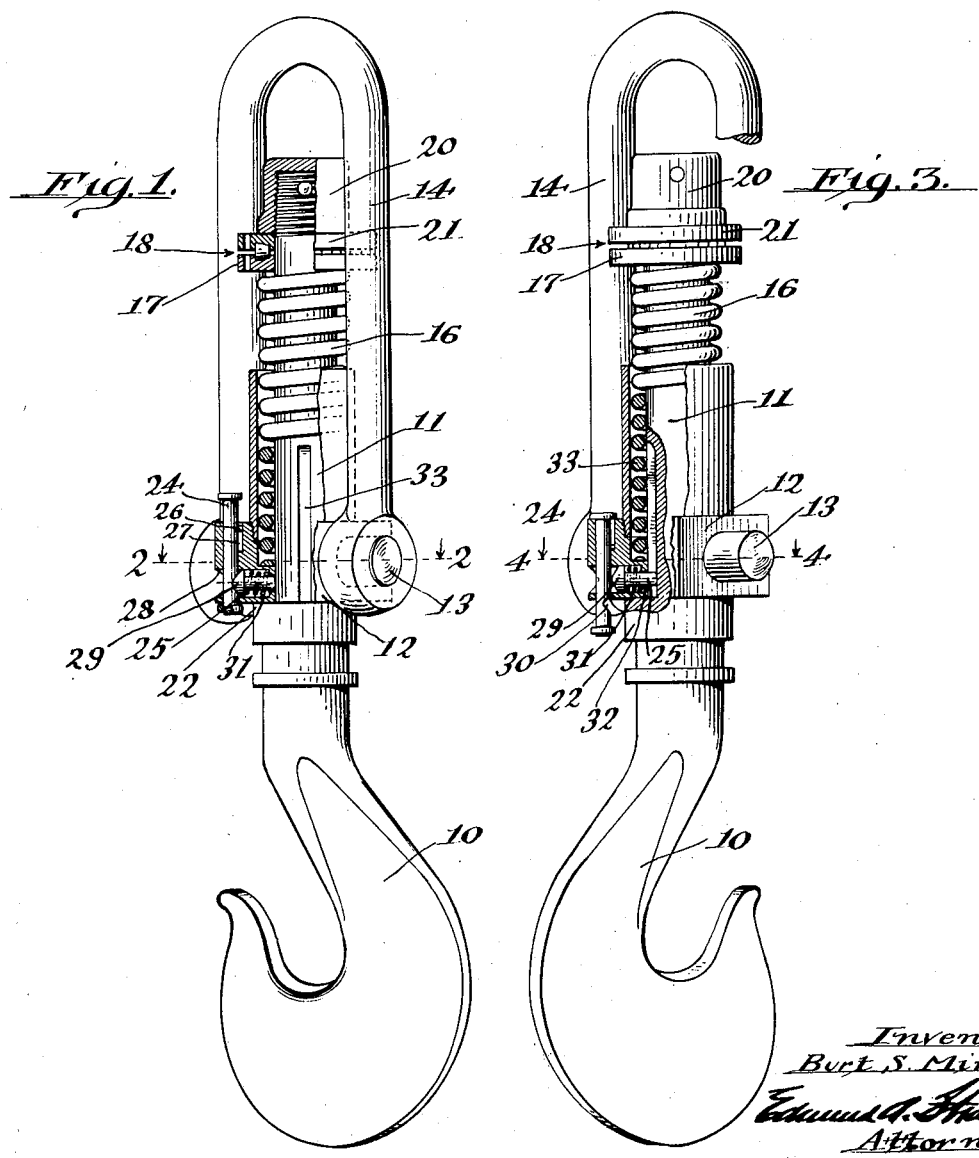
Inventor.
Burt S. Minor.
Edward A. Shaw
Attorney.

Patented Aug. 15, 1933

1,922,386

UNITED STATES PATENT OFFICE 1,922,386

LOCKING DEVICE FOR SWIVELING CASING HOOKS

Burt S. Minor, San Pedro, California

Application June 10, 1932. Serial No. 616,448

1 Claim. (Cl. 294—82)

This invention relates to swivel hooks employed in oil well drilling operations, more specifically to a locking device for such hooks.

In well drilling operations, a swivel hook attached to a travelling block serves to carry the hydraulic swivel or the casing elevator. When the elevator is employed, it is necessary that it may turn with the hook (proper) in order to prevent twisting of the travelling block and lines passing therefrom to the crown block. On the other hand, when the swivel is used the hook should be locked so that the kelly and drill pipe will turn in the swivel in order to prevent twisting of the hose connected thereto.

On account of the heavy loads imposed on hooks of the above character, they are consequently of such weight that they cannot be manually lifted or carried from one place to another, it being necessary to move or drag them with suitable tackle.

It has been found that attachments such as a locking device (to which this invention relates) very frequently become broken or damaged during moving of the hook, especially so if such parts are exposed.

The object of this invention is to provide a locking device for swivel hooks constructed in such a manner that its working parts are protected against damage through contact with other objects.

Further objects are to provide a locking device for swivel hooks of a simple construction, which may be installed without materially altering the general construction of the hook, and which may be easily and quickly operated.

Other objects and advantages will be apparent from the following description, reference being had to the accompanying drawing, in which:

Fig. 1 is a side elevation of a swivel hook provided with the improved locking device as it appears with the locking bolt in released position to permit swiveling of the hook proper, parts being broken away and shown in section.

Fig. 2 is a horizontal section taken substantially on line 2—2 of Fig. 1.

Fig. 3 is a view analogous to Fig. 1, but with the bolt in locked position.

Fig. 4 is a section taken on line 4—4 of Fig. 3.

Referring more specifically to the drawing, 10 designates the hook proper which is formed integral with a cylindrical shank 11 rotatably and slidably mounted in a block 12, and pivotally mounted on oppositely disposed trunnions 13 projecting from the block is a bail 14 adapted to be connected to a travelling block (not shown) of the usual hoisting apparatus employed in a well drilling rig.

Encircling the shank is a coil spring 16 which serves as a shock absorber, also to automatically lift a stand or section of drill pipe when it is unscrewed from the pipe in the hole in order to prevent damage to the screw threads of the pin and box of the tool joints. The opposite ends of the spring engage the face of a recess formed in the block and the bottom race 17 of an antifriction thrust bearing 18 respectively, and screw threaded on the upper end of the shank is a nut or cap which engages the upper race 21 of said bearing. A shoulder or abutment 22 formed on the shank below the block limits its upward movement against expansion of said spring. The parts above described operate in the same manner as the apparatus disclosed in a United States patent issued to Wilson B. Wigle.

The present invention resides in the locking device constructed as follows:

Slidably mounted in a bore formed in block 12, preferably in one corner, is a push pin 24 which serves to actuate a locking bolt 25, the pin being held against rotation by a stud 26 projecting therefrom into a groove 27 formed in the face of the bore.

The locking bolt is slidably mounted in a recess 28 communicating with the aforesaid bore, and is provided with a tapered head 29 urged into engagement with a notch 30 formed in pin 24 by an expansion coil spring 31 which encircles the bolt, the opposite ends of said spring engaging the head and inner face of the recess respectively. The bolt being slidably mounted in an opening 32 communicating with the recess, and the opening in block 12 through which the hook shank 11 extends.

From the construction it will be seen that by moving the push pin 24 up or down the locking bolt may be moved into or out of engagement with the groove 33 formed in the shank. This may be done by striking the opposite ends of the pin with a suitable tool such as a hammer. For example, when it is desired to lock the hook against rotation the pin is driven downwardly, the action of which forces the bolt into engagement with the groove as shown in Figs. 3 and 4.

I claim:

In a hook of the character described, a block, a hook having a shank with a groove formed therein slidably and rotatably mounted in said block, a pin having a notch formed therein slidably mounted in a bore formed in said block, a locking bolt having a tapered head slidably mounted in a recess formed in said block, and an expansion spring normally urging the head of said locking bolt into engagement with the notch formed in said pin and out of engagement with the groove formed in the shank.

BURT S. MINOR.